(12) United States Patent
Reiner et al.

(10) Patent No.: US 8,725,869 B1
(45) Date of Patent: May 13, 2014

(54) CLASSIFYING SITUATIONS FOR SYSTEM MANAGEMENT

(75) Inventors: David Stephen Reiner, Lexington, MA (US); Stephen G. Graham, Chapel Hill, NC (US); Stephen Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 244 days.

(21) Appl. No.: 13/250,310

(22) Filed: Sep. 30, 2011

(51) Int. Cl.
*G06F 15/173* (2006.01)
*G08B 5/22* (2006.01)

(52) U.S. Cl.
USPC ............................ 709/224; 340/4.6

(58) Field of Classification Search
USPC ............................ 711/154; 709/224; 340/4.6
See application file for complete search history.

(56) References Cited

U.S. PATENT DOCUMENTS

| | | | | |
|---|---|---|---|---|
| 5,712,966 A * | 1/1998 | Nadachi | .................. | 345/428 |
| 6,233,449 B1 * | 5/2001 | Glitho et al. | .................. | 455/423 |
| 6,456,234 B1 * | 9/2002 | Johnson | .................. | 342/357.48 |
| 6,731,238 B2 * | 5/2004 | Johnson | .................. | 342/357.48 |
| 6,834,287 B1 * | 12/2004 | Folk-Williams et al. | .............. | 1/1 |
| 7,082,099 B2 * | 7/2006 | Ueno et al. | .................... | 370/216 |
| 7,159,081 B2 * | 1/2007 | Suzuki | .......................... | 711/154 |
| 7,187,997 B2 * | 3/2007 | Johnson | ........................ | 700/245 |
| 7,313,659 B2 * | 12/2007 | Suzuki | .......................... | 711/154 |
| 7,386,396 B2 * | 6/2008 | Johnson | ........................ | 701/300 |
| 7,461,044 B2 * | 12/2008 | Salahshour et al. | ............ | 706/47 |
| 7,526,541 B2 * | 4/2009 | Roese et al. | .................. | 709/223 |
| 7,581,249 B2 * | 8/2009 | Bussiere et al. | ................ | 726/22 |
| 7,710,290 B2 * | 5/2010 | Johnson | .......................... | 340/8.1 |
| 7,730,007 B2 * | 6/2010 | Salahshour et al. | ............ | 706/46 |
| 7,739,372 B2 * | 6/2010 | Roese et al. | .................. | 709/223 |
| 8,031,050 B2 * | 10/2011 | Johnson | .......................... | 340/8.1 |
| 8,060,389 B2 * | 11/2011 | Johnson | ............................ | 705/6 |
| 8,073,565 B2 * | 12/2011 | Johnson | ........................ | 700/245 |
| 8,131,992 B2 * | 3/2012 | Ennis et al. | .................. | 713/100 |
| 8,209,409 B2 * | 6/2012 | Mopur et al. | .................. | 709/223 |
| 8,443,157 B1 * | 5/2013 | Reiner | .......................... | 711/154 |
| 2001/0027470 A1 * | 10/2001 | Ulmer et al. | .................. | 709/203 |
| 2002/0164999 A1 * | 11/2002 | Johnson | ........................ | 455/456 |

(Continued)

OTHER PUBLICATIONS

U.S. Appl. No. 12/639,668 filed in the name of David Stephen Reiner Dec. 16, 2009 and entitled "Data Storage System Having Associated Situational Analysis Framework for Automatic Response to Movement in a State Space."

(Continued)

*Primary Examiner* — Brian P Whipple
*Assistant Examiner* — Michael A Chambers
(74) *Attorney, Agent, or Firm* — Ryan, Mason & Lewis, LLP (57) ABSTRACT

An information processing system comprises a system management tool, a managed system and a classifier. The system management tool receives a result of a situation classification operation from the classifier, and automatically takes a management action relating to the managed system based at least in part on the result of the situation classification operation. The situation classification result may be determined by monitoring operation of the managed system in a situational state space having dimensions that characterize operating conditions of the system, and identifying a current state of the system in the situational state space. The management action automatically taken by the system management tool may comprise, for example, setting at least one policy for the managed system by selecting and deploying a particular one of a plurality of policy sets responsive to the result of the situation classification operation.

20 Claims, 5 Drawing Sheets

(56) References Cited

U.S. PATENT DOCUMENTS

| | | | |
|---|---|---|---|
| 2002/0178397 A1* | 11/2002 | Ueno et al. | 714/4 |
| 2004/0013086 A1* | 1/2004 | Simon et al. | 370/230 |
| 2004/0186903 A1* | 9/2004 | Lambertz | 709/224 |
| 2004/0252051 A1* | 12/2004 | Johnson | 342/357.09 |
| 2006/0022048 A1* | 2/2006 | Johnson | 235/462.1 |
| 2006/0085836 A1* | 4/2006 | Lyons et al. | 726/1 |
| 2007/0005188 A1* | 1/2007 | Johnson | 700/245 |
| 2007/0232326 A1* | 10/2007 | Johnson | 455/456.1 |
| 2007/0233387 A1* | 10/2007 | Johnson | 701/300 |
| 2007/0233388 A1* | 10/2007 | Johnson | 701/300 |
| 2007/0276587 A1* | 11/2007 | Johnson | 701/200 |
| 2008/0030308 A1* | 2/2008 | Johnson | 340/286.02 |
| 2008/0250042 A1* | 10/2008 | Mopur et al. | 707/100 |
| 2008/0281607 A1* | 11/2008 | Sajja et al. | 705/1 |
| 2008/0281660 A1* | 11/2008 | Sajja et al. | 705/8 |
| 2009/0022474 A1* | 1/2009 | Kubono et al. | 386/52 |
| 2009/0031006 A1* | 1/2009 | Johnson | 709/218 |
| 2009/0055406 A1* | 2/2009 | Kubono et al. | 707/10 |
| 2009/0271271 A1* | 10/2009 | Johnson | 705/14.58 |
| 2009/0271589 A1* | 10/2009 | Karpoff et al. | 711/170 |
| 2009/0319658 A1* | 12/2009 | Chioiu et al. | 709/224 |
| 2010/0083174 A1* | 4/2010 | Lee et al. | 715/810 |
| 2010/0131584 A1* | 5/2010 | Johnson | 709/203 |
| 2010/0207782 A1* | 8/2010 | Johnson | 340/825.49 |
| 2010/0225762 A1* | 9/2010 | Augst | 348/148 |
| 2011/0004914 A1* | 1/2011 | Ennis et al. | 726/1 |
| 2011/0067059 A1* | 3/2011 | Johnston et al. | 725/39 |
| 2011/0071904 A1* | 3/2011 | Peng | 705/14.54 |
| 2012/0102225 A1* | 4/2012 | Bhardwaj et al. | 709/241 |
| 2012/0198057 A1* | 8/2012 | Ennis et al. | 709/224 |
| 2012/0271913 A1* | 10/2012 | Tallgren et al. | 709/217 |

OTHER PUBLICATIONS

U.S. Appl. No. 13/071,926 filed in the name of D.S. Reiner et al. Mar. 25, 2011 and entitled "Managing Information Management Systems."

U.S. Appl. No. 13/077,376 filed in the name of H.S. Raizen et al. Mar. 31, 2011 and entitled "Adaptive Optimization Across Information Technology Infrastructure."

U.S. Appl. No. 13/166,128 filed in the name of D.S. Reiner et al. Jun. 22, 2011 and entitled "Providing System Management Services."

David Reiner et al., "A Method for Adaptive Performance Improvement of Operating Systems," ACM Sigmetrics Conference on Measurement and Methodology of Computer Systems, Sep. 1981, pp. 2-10.

David Stephen Reiner, Ph.D. Dissertation, "A Method for Adaptive Performance Improvement of Operating Systems," The University of Wisconsin—Madison, 1980, No. 80-23427, 185 pages.

U.S. Appl. No. 12/494,622 filed in the name of Dean D. Throop et al. Jun. 30, 2009 and entitled "Facilitating Data Migration Between Tiers."

* cited by examiner

CLASSIFYING SITUATIONS FOR SYSTEM MANAGEMENT

RELATED APPLICATIONS

This application is related to co-pending U.S. patent application Ser. No. 12/639,668, filed Dec. 16, 2009 and entitled "Data Storage System Having Associated Situational Analysis Framework for Automatic Response to Movement in a State Space," Ser. No. 13/071,926, filed Mar. 25, 2011 and entitled "Managing Information Management Systems," Ser. No. 13/077,376, filed Mar. 31, 2011 and entitled "Adaptive Optimization Across Information Technology Infrastructure," and Ser. No. 13/166,128, filed Jun. 22, 2011 and entitled "Providing System Management Services," all of which are commonly assigned herewith and incorporated by reference herein.

FIELD OF THE INVENTION

The present invention relates generally to the field of information processing, and more particularly to management of information processing systems.

BACKGROUND OF THE INVENTION

Information processing systems comprising virtual data centers (VDCs) and other types of cloud infrastructure are coming into increasingly widespread use. For example, commercially available virtualization software may be used to build a wide variety of different types of cloud infrastructure, including private and public cloud computing and storage systems, distributed across hundreds of interconnected physical computers and storage devices. As the complexity of such cloud infrastructure increases, the need for accurate and efficient management of system resources has also grown.

This management of system resources is often implemented using system management tools such as quality of service (QoS) managers, data migration managers, resource managers, load balancers, workflow managers and event handlers.

An issue that arises when using conventional system management tools is that such tools often do not have a sufficiently broad view of all of the various situations that may impact the operating performance of their corresponding managed systems, particularly in the case of managed systems that comprise cloud infrastructure. For example, such management tools often base their policy decisions solely on local knowledge, or other types of limited knowledge that does not adequately reflect high-level situations that may have a significant impact on operating performance of the managed systems. Also, policy setting in conventional system management tools typically requires significant human intervention, for example, from an administrator or other employee of a corresponding enterprise.

SUMMARY OF THE INVENTION

Illustrative embodiments of the present invention overcome the above-described deficiencies of conventional practice by providing mechanisms for delivery of external situational classification results to a system management tool.

In one aspect, an information processing system comprises a system management tool, a managed system and a classifier. The system management tool receives a result of a situation classification operation from the classifier, and automatically takes a management action relating to the managed system based at least in part on the result of the situation classification operation. The situation classification result may be determined by monitoring operation of the managed system in a situational state space having dimensions that characterize operating conditions of the system, and identifying a current state of the system in the situational state space. The management action automatically taken by the system management tool may comprise, for example, setting at least one policy for the managed system by selecting and deploying a particular one of a plurality of policy sets responsive to the result of the situation classification operation. It is to be appreciated, however, that every situation classification result received from the classifier need not lead to a corresponding management action in the system management tool.

A given one of the illustrative embodiments advantageously provides a system management tool with a much broader view of situations that may impact the operating performance of its managed system. This allows the system management tool to make better decisions regarding operating policies or other parameters of the managed system, leading to improved performance in the managed system.

These and other features and advantages of the present invention will become more readily apparent from the accompanying drawings and the following detailed description.

DETAILED DESCRIPTION

The present invention will be described herein with reference to exemplary information processing systems and associated computers, servers, storage devices, virtual machines and other processing devices. It is to be appreciated, however, that the invention is not restricted to use with the particular illustrative system and device configurations shown. Moreover, the term "information processing system" as used herein is intended to be broadly construed, so as to encompass, for example, private or public cloud computing or storage systems, as well as other types of systems.

Figure 1A:
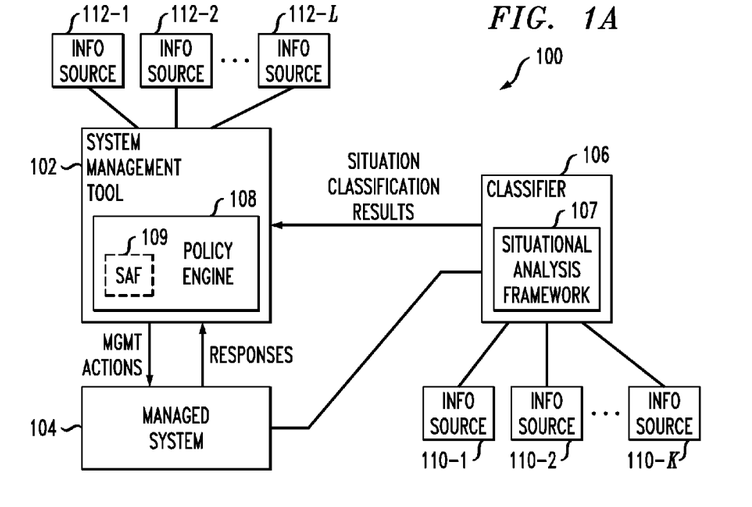
FIG. 1A is a block diagram showing one example of an information processing system in an illustrative embodiment of the invention.

FIG. 1A shows an information processing system 100 configured in accordance with an illustrative embodiment of the present invention. The information processing system 100 comprises a system management tool 102, a managed system 104 and a classifier 106. The system management tool 102 receives results of situation classification operations performed by a situational analysis framework (SAF) 107 implemented in the classifier 106, and automatically takes management actions relating to the managed system based 104 at least in part on the results of the situation classification operations.

The situational analysis framework 107 may determine a given situation classification result by monitoring operation of the managed system 104 in a situational state space having dimensions that characterize operating conditions or other issues impacting operation of the managed system, including external issues such as external time and event status, and identifying a current state of the managed system in the situational state space. An example of one possible configuration of the situational analysis framework 107 of classifier 106 will be described in greater detail below in conjunction with FIG. 2.

The management actions automatically taken by the system management tool 102 may comprise, for example, setting at least one policy for the managed system 104 by selecting and deploying a particular one of a plurality of policy sets responsive to the result of the situation classification operation. Such policy selection and deployment may be carried out by a policy engine 108 of the system management tool 102. The policy engine 108 of the system management tool 102 may itself comprise an instance of a situational analysis framework 109, shown in dashed outline as an optional component.

The system management tool 102 may comprise, for example, at least one of a quality of service manager, a data migration manager, a resource manager, a load balancer, a workflow manager and an event handler, although a wide variety of other types of system management tools may be utilized in implementing the invention.

As noted above, the classifier 106 performs situation classification operations using situational analysis framework 107 and provides the corresponding situation classification results to the system management tool 102. One or more of these results may be provided to the system management tool 102 via an application programming interface (API). Performance of a given situational classification operation may involve, for example, monitoring operation of the managed system 104 in a situational state space having dimensions that characterize operating conditions of the system, and identifying a current state of the system in the situational state space. This current state of the system is an example of what is more generally referred to herein as a "situation."

The situation classification operations performed by classifier 106 may be performed periodically, or responsive to occurrence of designated events, or using a combination of these or other operation timing controls.

The classifier 106 may utilize information obtained from the managed system 104 itself, as well as additional information obtained from multiple external information sources 110-1, 110-2, ... 110-K, in determining the current state of the managed system 104 within the situational state space.

A given situation classification result provided by the classifier 106 may comprise additional related information, such as an urgency indicator, a completeness indicator, or other indicator reflecting a characteristic of the result. Alternatively, such indicators may be considered part of the situation classification result. A given situation classification result may comprise one or more elements of an associated classification scheme, such as "heavily loaded" or "lightly loaded" in a two-level loading classification, or a vector of values indicating a particular position in a situational state space. The term "situation classification result" as used herein is therefore intended to be broadly construed, and may comprise, for example, a multidimensional vector of classification.

In determining appropriate management actions relating to managed system 104 responsive to situation classification results from the classifier 106, the system management tool 102 may also take into account additional information available to the system management tool. This additional information may comprise, for example, local information available internally to the system management tool 102 as well as a "mash-up" or other combination of information obtained from a plurality of information sources 112-1, 112-2, ... 112-L that are located external to the system management tool.

Although the system elements 102, 104 and 106 are shown as separate elements in FIG. 1A, these elements or portions thereof may be implemented at least in part on a common processing platform. In other embodiments, one or more of the system elements 102, 104 and 106 may each be implemented on a separate processing platform, such as the processing platform to be described below in conjunction with FIG. 4. For example, the classifier 106 comprising situational analysis framework 107 may be implemented on a first processing device of a first processing platform and the system management tool 102 may be implemented on a second processing device of a second processing platform. It is also to be understood that a given embodiment of the system 100 may include multiple instances of the elements 102, 104 and 106, although only single instances of such elements are shown in the system diagram for clarity and simplicity of illustration.

Figure 1B:
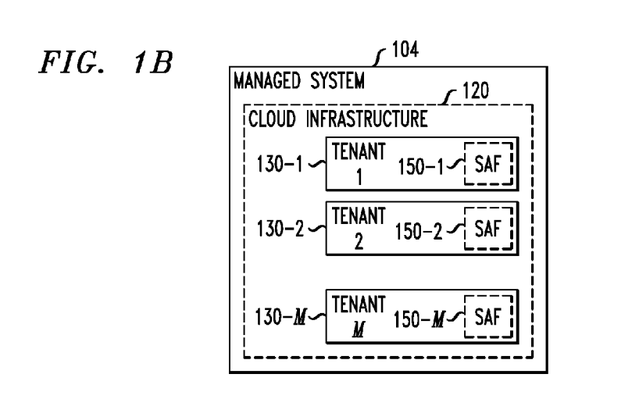
FIGS. 1B and 1C show more detailed views of portions of the FIG. 1A system.

FIG. 1B shows a more detailed view of one possible embodiment of the managed system 104. In this embodiment, the managed system 104 comprises cloud infrastructure 120, which may be viewed as generally comprising a combination of physical infrastructure and virtual infrastructure. The cloud infrastructure 120 includes multiple tenant portions 130-1, 130-2, ... 130-M, each of which is associated with a separate tenant and may have a separate situational analysis framework 150-1, 150-2, ... 150-M associated therewith. In other embodiments, the managed system 104 may be part of the cloud infrastructure 120. Thus, cloud infrastructure 120 may fully encompass the managed system 104 as well as one or more other managed systems or system components.

Figure 1C:
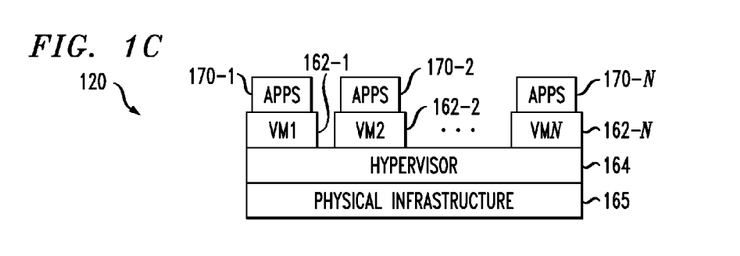

As shown in FIG. 1C, the cloud infrastructure 120 comprises virtual machines (VMs) 162-1, 162-2, ... 162-N implemented using a hypervisor 164. The hypervisor 164 is an example of what is more generally referred to herein as "virtualization infrastructure." The hypervisor 164 runs on physical infrastructure 165. The cloud infrastructure 106 further comprises sets of applications 170-1, 170-2, ... 170-N running on respective ones of the virtual machines 162-1, 162-2, ... 162-N under the control of the hypervisor 164.

Although only a single hypervisor 164 is shown in the example of FIG. 1C, a given embodiment of cloud infrastructure configured in accordance with the invention may include multiple hypervisors, each running on its own physical infrastructure. Portions of that physical infrastructure might be virtualized.

An example of a commercially available hypervisor platform that may be used to implement portions of the cloud infrastructure 120 in one or more embodiments of the invention is the VMware® vSphere™ which may have an associated virtual infrastructure management system such as the VMware® vCenter™. The underlying physical infrastructure 165 may comprise one or more distributed processing platforms that include hardware products such as Celerra® or CLARiiON®, both commercially available from EMC Corporation of Hopkinton, Mass. A variety of other storage products, such as VNX and Symmetrix VMAX, both also from EMC Corporation, may be utilized to implement at least a portion of the cloud infrastructure 120.

Figure 2:
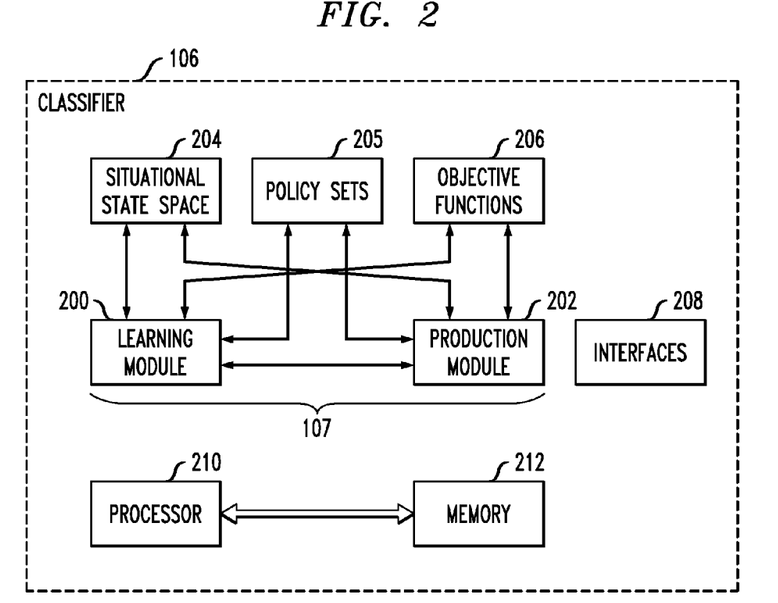
FIG. 2 is a more detailed view of a classifier comprising a situational analysis framework in the FIG. 1A system.

The situational analysis framework 107 of classifier 106, the situational analysis framework 109 of system management tool 102, or one or more of the situational analysis frameworks 150 of the tenants 130 may each be configured in the manner shown in FIG. 2. In this example, situational analysis framework 107 of classifier 106 is more specifically shown as comprising a learning module 200 coupled to a production module 202. Other components of the situational analysis framework 107 include situational state space 204, policy sets 205, and objective functions 206. The learning module and the production module both have access to the situational state space 204, policy sets 205, and objective functions 206. The classifier 106 interfaces with the system management tool 102 and the managed system 104 via interfaces 208.

The classifier 106 in this embodiment further comprises a processor 210 coupled to a memory 212. The learning and production modules 200 and 202 of the situational analysis framework 107 may be implemented in whole or in part in the form of one or more software programs stored in memory 212 and executed by processor 210. Accordingly, the memory 212 may be viewed as an example of what is more generally referred to herein as a "computer program product" having executable computer program code embodied therein. The computer program code when executed in a processing device implementing the situational analysis framework 107 causes the device to perform situation classification operations as disclosed herein.

It is to be appreciated that the classifier 106 may comprise other modules or components in addition to those specifically shown in FIG. 2. For example, the classifier may provide various other service interfaces, as well as security or other types of functionality within the system 100.

Although FIG. 2 specifically illustrates the situational analysis framework 107, the situational analysis framework 109 of system management tool 102 and/or the situational analysis frameworks 150 associated with respective tenants 130 of cloud infrastructure 120 may each be implemented in a similar manner.

In other embodiments, different types of situational analysis frameworks may be implemented in different system components. For example, the policy sets 205 of the situational analysis framework 107 may be eliminated as policy-based actions in the present embodiment are undertaken by policy engine 108 in system management tool 102 based on situation classification results provided by the classifier 106. The frameworks 150, however, may continue to include policy sets particular to the respective tenants 130.

Additional details regarding the operation of situational analysis frameworks that may be implemented in embodiments of the present invention can be found in the above-cited U.S. patent application Ser. No. 12/639,668, Ser. No. 13/071, 926, Ser. No. 13/077,376, and Ser. No. 13/166,128.

Exemplary situational analysis frameworks disclosed in one or more of the above-cited patent applications may be configured to learn what policy settings are best, possibly by maximizing an objective function, for situations in a specified multidimensional situation space, and to apply these policies in production. Policies may set operating parameters of an associated system, and may also or alternatively suggest how management operations should be staged, split, deferred, or approved based on factors such as user experience levels, operation log mining, and situation recognition. Furthermore, policies may be set or recommended as a system management service.

In information processing system 100 of FIG. 1A, situation classification is performed separately from policy determination and application. As noted above, situation classifications are performed by the classifier 106, and may be performed periodically or as triggered by events. Situation classifications results are then exported to the system management tool 102 for possible action which may also take into account a "mash-up" or other combination of information from the multiple external sources 112.

It should be noted that the system management tool 102 may itself include an instance of a situational analysis framework, possibly implemented within the policy engine 108. In such an arrangement, the situational analysis framework of the system management tool may, for example, receive the situation classification results from the classifier 106, and may make policy decisions or other management operation decisions based entirely or partially on a combination of the incoming situation classification results, its own internal knowledge, and inputs from other mashed up sources such as the external sources 112.

An arrangement of the type shown in FIG. 1A advantageously allows current situation classifications to be exported from the classifier 106 to the system management tool 102, which balances those results with its own knowledge about incoming hints on future activity to make policy and setting changes that affect operations of the managed system 104. This provides a much broader context in which to consider and make changes, and also gives more control to the system management tool, as compared to having its own situational analysis be solely responsible for setting policies in the managed system.

The present embodiment therefore substantially expands the range of dimensional metrics that may be used by the system management tool 102. This range may include local conditions or pertinent information known to a variety of other management tools. The disclosed techniques allow these multiple system management tools to cooperate with one another in a loosely-coupled manner through the situation classification results provided by the classifier 106. Thus, potentially suboptimal unilateral decisions based solely on situational analysis performed within the system management tool 102 are avoided.

It should therefore be apparent that the classifier 106 can provide its situation classification results to multiple system management tools, thereby improving the operation of all of the corresponding managed systems. A given management tool or associated managed system can subscribe to the situation classification results using, for example, a software as a service (SaaS) model. This turns the classifier 106 into a supplier of potentially valuable situation classifications for loosely-coupled system management tools that may be setting policies or taking other management actions. As indicated previously, these system management tools may each base policy decisions on their own local knowledge as well as the situation classification results from the classifier 106.

Figure 3:
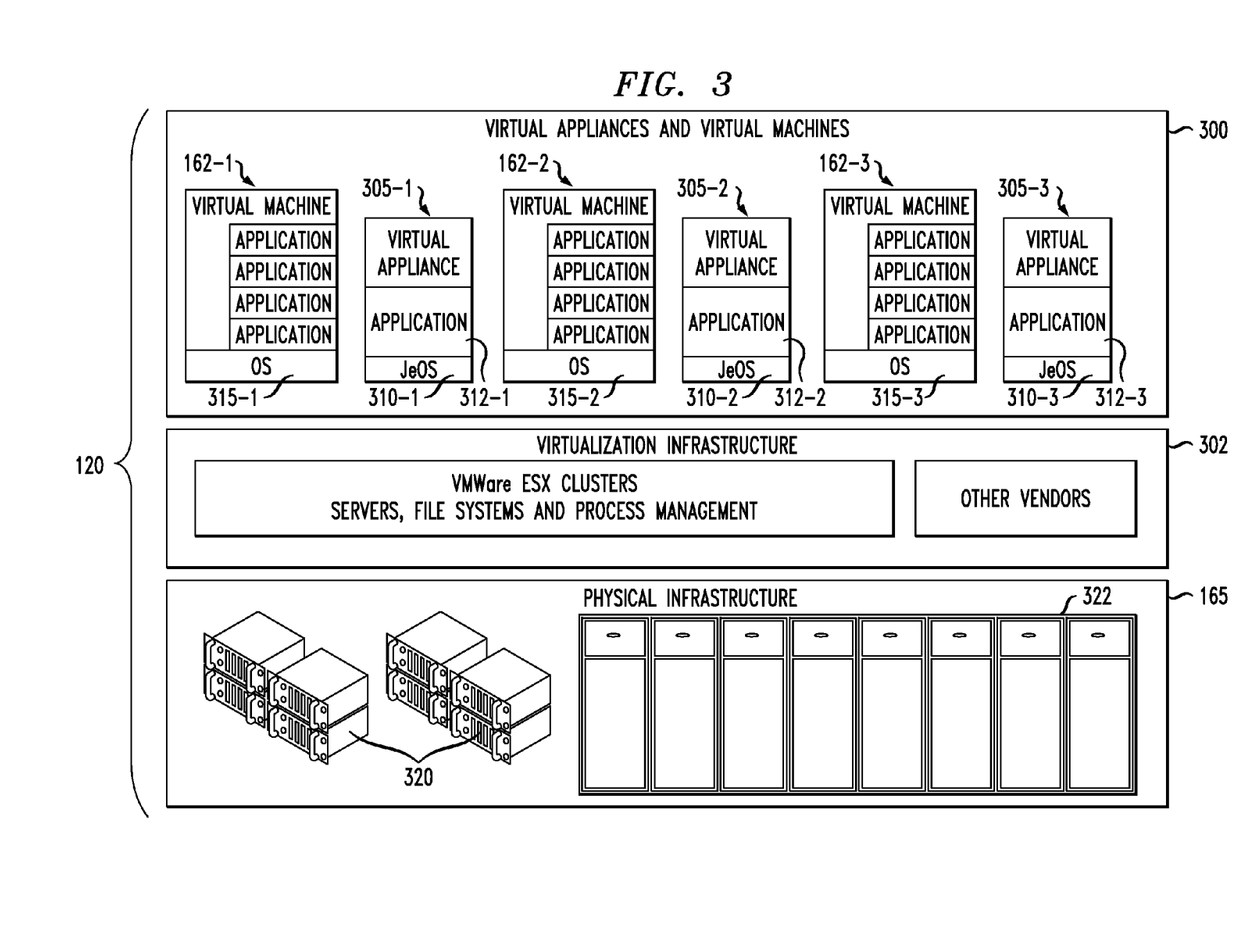
FIG. 3 illustrates portions of the cloud infrastructure of the FIG. 1A system.

FIG. 3 shows a more detailed view of another possible implementation of the cloud infrastructure 120 in an illustrative embodiment. In this embodiment, a set of virtual appliances and virtual machines 300 comprises multiple virtual appliances 305-1, 305-2 and 305-3 and multiple virtual machines 162-1, 162-2 and 162-3.

The virtual appliances and the virtual machines 300 are implemented using virtualization infrastructure 302 which illustratively comprises VMware® ESX clusters as well as associated servers, file systems and process management elements, and may also include additional virtualization products from other vendors.

The virtual appliances 110-1, 110-2 and 110-3 comprise minimal operating systems 310-1, 310-2 and 310-3 and run single applications 312-1, 312-2 and 312-3, respectively. The minimal operating systems 310 utilized for the licensing virtual appliances 305 more particularly comprise respective JeOS instances, where JeOS denotes "Just enough Operating System." The virtual machines 162-1, 162-2 and 162-3 each comprise sets of multiple applications and a corresponding full operating system 315-1, 315-2 or 315-3. The physical infrastructure 165 in this embodiment comprises banks of computers, servers or other processing devices generally denoted by reference numerals 320 and 322.

It is to be appreciated that the particular arrangements of cloud infrastructure elements shown in FIGS. 1C and 3 are presented by way of illustrative example only, and in other embodiments different arrangements of additional or alternative elements may be used. At least a subset of the elements may be collectively implemented on a common processing platform, or using separate processing platforms each comprising one or more computers, servers, storage devices, or other processing devices.

Figure 4:
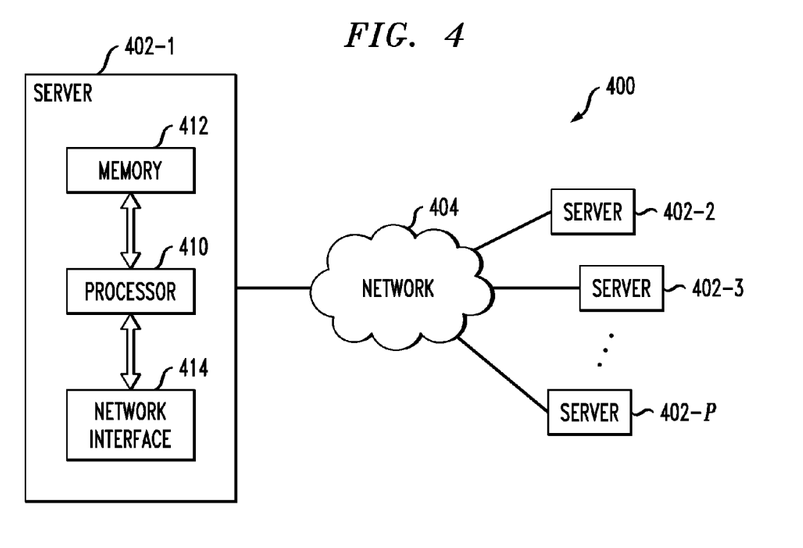
FIG. 4 shows an exemplary processing platform that implements at least a portion of the FIG. 1A system

An example of such a processing platform is processing platform 400 shown in FIG. 4.

The processing platform 400 in this embodiment comprises a portion of the system 100 and includes a plurality of servers, denoted 402-1, 402-2, 402-3, . . . 402-P, which communicate with one another over a network 404. One or more of the processing modules of system 100 may therefore each run on a computer, server, or other processing platform element. A given such element may be viewed as an example of what is more generally referred to herein as a "processing device." As illustrated in FIG. 4, such a device generally comprises at least one processor and an associated memory, and implements one or more functional modules or other components for controlling certain features of the information processing system 100. Again, multiple ones of the processing modules of system 100 may be implemented by a single processing device in a given embodiment. Also, it should be noted that a given processing device may comprise one or more virtual machines.

The server 402-1 in the processing platform 400 comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements. The memory 412 may be viewed as another example of what is more generally referred to herein as a "computer program product" having executable computer program code embodied therein. Such a memory may comprise electronic memory such as random access memory (RAM), read-only memory (ROM) or other types of memory, in any combination.

The computer program code when executed by a processing device such as the server 402-1 causes the device to perform functions associated with one or more of the modules of system 100, such as the system management tool 102, managed system 104 or classifier 106. One skilled in the art would be readily able to implement such software given the teachings provided herein. Other examples of computer program products embodying aspects of the invention may include, for example, optical or magnetic disks, or other storage devices, or suitable portions or combinations of such devices. In addition to storing computer program code, such storage devices will also generally be used to store data within system 100.

Also included in the server 402-1 is network interface circuitry 414, which is used to interface the server with the network 404 and other system components. Such circuitry may comprise conventional transceivers of a type well known in the art.

The other servers 402 of the processing platform 400 are assumed to be configured in a manner similar to that shown for server 402-1 in the figure.

The processing platform 400 shown in FIG. 4 may comprise additional known components such as batch processing systems, parallel processing systems, physical machines, virtual machines, virtual switches, storage arrays, storage volumes, etc. Again, the particular processing platform shown in the figure is presented by way of example only, and system 100 may include additional or alternative processing platforms, as well as numerous distinct processing platforms in any combination.

Also, numerous other arrangements of computers, servers, storage devices, virtual machines or other processing devices are possible in the information processing system 100. Such devices can communicate with other elements of the information processing system 100 over any type of network, such as a wide area network (WAN), a local area network (LAN), a satellite network, a telephone or cable network, or various portions or combinations of these and other types of networks.

The operation of the system 100 will now be described in greater detail with reference to FIGS. 5 and 6.

Figure 5:
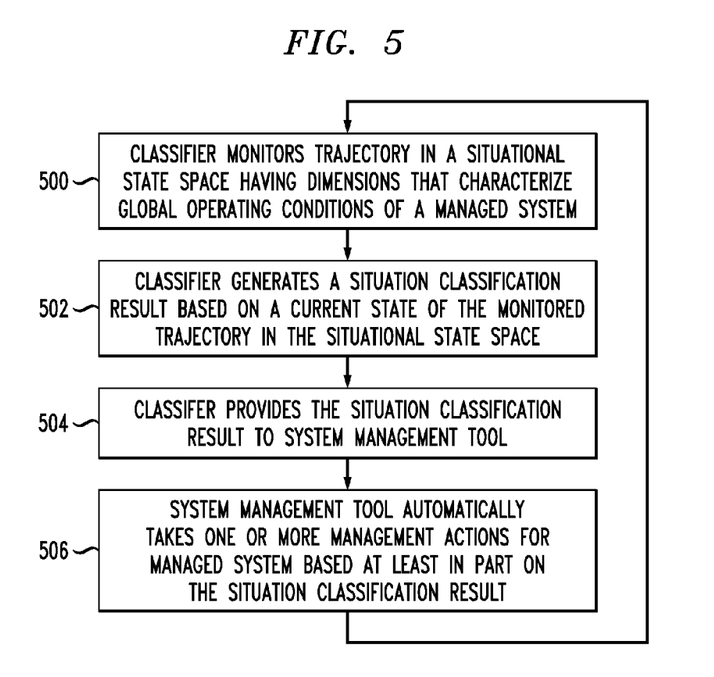
FIG. 5 is a flow diagram of process implemented in the FIG. 1A system.

Referring initially to FIG. 5, a process of classifying situations for system management is shown. The process includes steps 500 through 506, and is implemented in the information processing system 100 of FIG. 1A.

In step 500, the classifier 106 monitors trajectory in a situational state space having dimensions that characterize "global" operating conditions of the managed system 104. These global operating conditions may be high-level operating conditions that would not otherwise be apparent to the system management tool 102 based on its current scope of view, as will be described in conjunction with FIGS. 6A and 6B.

In step 502, the classifier 106 generates a situation classification result based on the current state of the monitored trajectory in the situational state space.

In step 504, the classifier 106 provides the situation classification result to the system management tool 102, possibly via an API as previously noted. The classifier may provide the situation classification result to the system management tool in response to an explicit request received from the system management tool.

In step 506, the system management tool 102 automatically takes one or more management actions for the managed system 104 based at least in part on the situation classification result. It is also possible that, based on the received situation classification result, the system management tool may take no action. The determination in the system management tool 102 as to whether or not to take an action in response to a particular situation classification result may be based on an aggressiveness parameter, a decision threshold, a policy suggestion or other information. Such information may be part of or otherwise associated with the situation classification result, or separately maintained by the system management tool.

The process then repeats as the situational analysis framework 107 of the classifier 106 continues to monitor trajectory in the situational state space and to generate associated situation classification results for the system management tool 102.

It should be noted that the particular process steps shown in the flow diagram of FIG. 5 are presented by way of illustrative example only, and should not be construed as limiting the scope of the invention in any way. For example, although the steps are indicated in the diagram as being performed serially, one or more of the steps may be performed in parallel with one another. Also, the ordering of the steps may be varied, and additional or alternative steps may be included.

Figure 6A:
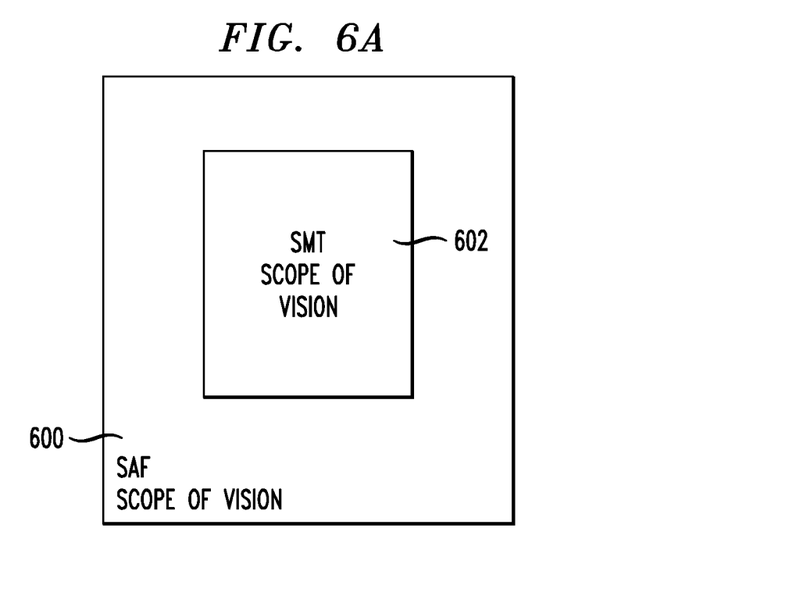
FIGS. 6A and 6B show possible relationships between situational view scopes of a situational analysis framework and a system management tool in illustrative embodiments.
Figure 6B:
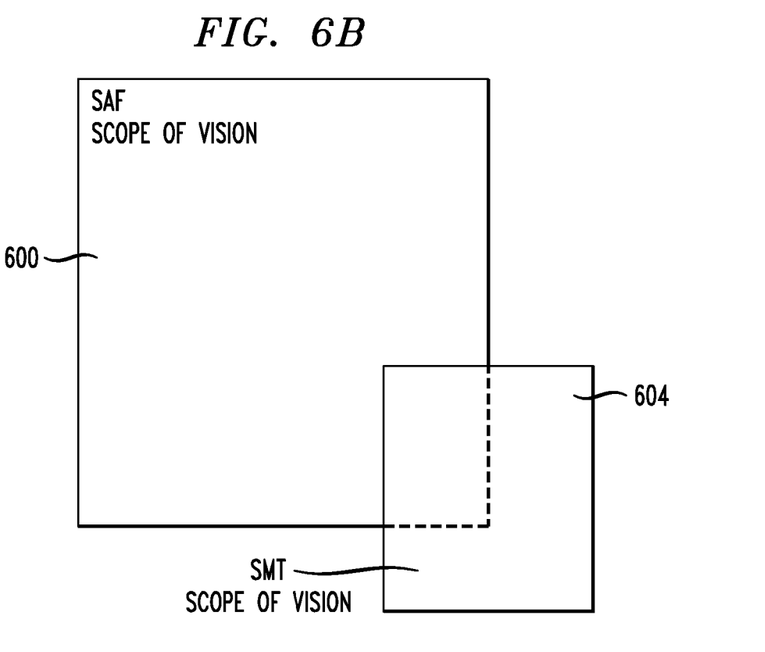

FIGS. 6A and 6B show possible relationships between situational view scopes of the situational analysis framework 107 and the system management tool 102 in illustrative embodiments. For example, in FIG. 6A, the situational analysis framework 107 of the classifier 106 has a scope of vision 600 that is broader than and fully encompasses a scope of vision 602 of the system management tool (SMT). Another example is shown in FIG. 6B, where the scope of vision 604 of the system management tool 102 only partially overlaps with the scope of vision 600 of the situational analysis framework 107. The scope of vision in this context should be understood to encompass, for example, the ability of the tool 102 or framework 107 to measure metrics associated with or otherwise impacting system operation.

In these and other configurations, the scope of vision 600 of the situational analysis framework 107 serves to significantly enhance the view of the system management tool 102 into high-level situations that can impact the performance of the managed system 104. The enhanced scope may be due to the situational analysis framework having better learning, more current information, better reasoning abilities, etc. relative to the system management tool alone. Accordingly, by basing its management actions relating to the managed system 104 at least in part on situation classification results provided by the situational analysis framework 107, the system management tool 102 can make better decisions regarding the establishment of operating policies or other parameters for the managed system, leading to improved performance in the managed system.

Additional examples will now be described to further illustrate the operation of the information processing system 100 of FIG. 1A in particular implementations.

As one additional example, the system management tool 102 may be assumed to comprise a QoS manager implemented in a cloud service environment of cloud infrastructure 120. The QoS manager in this example may be configured to adjust virtual resource scheduling in the cloud service environment in order to meet one or more service level agreements (SLAs) for the tenants 130, based on the situation classification results provided by classifier 106, possibly in combination with information characterizing individual tenants 130 and their associated virtual resources. The SLAs may relate to respective lines of service, such as performance, availability, security, etc.

The situational analysis framework 107 of classifier 106 in this example may have a broader view of tenant workloads, both current and projected. For instance, one tenant may have a history of rapid ramping up of workload at the end of every month, while another tenant may quiesce most activity when a new application is being deployed. The situational analysis framework 107 can communicate the overall situation as a service to the QoS manager, thereby complementing the QoS manager's view of the current state of the managed system. The QoS manager is therefore able to consider a wider range of strategies, such as deferring workload, or ramping up resources in anticipation of near-term demand, through an enhanced and more nuanced view of the current situation obtained by interaction with the situational analysis framework 107 of the classifier 106.

As another example, the information characterizing individual tenants 130 and their associated virtual resources may be processed by a mash-up application before being combined with one or more of the situation classification results from the classifier 106. The management action taken by the system management tool 102 in such an arrangement may comprise delivering one or more situation classification results to the separate situational analysis frameworks 150 associated with respective ones of a subset of the tenants 130 as identified by the system management tool 102 based on the result of the situation classification operation in combination with the information characterizing individual tenants 130 and their associated virtual resources.

More particularly, in a multi-tenancy environment such as that illustrated in FIG. 1B, a system event may be detected pertaining to a particular cloud infrastructure component such as a storage array. The event may pertain to a pending storage failure like a capacity utilization warning or a pending hardware failure. A mash-up application may be used to compare the resource identified with the event against a mapping of particular ones of the tenants 130 to particular resources in order to determine which tenant(s) may be impacted by the situation associated with the event. For each tenant that is so identified, the corresponding tenant-specific situational analysis framework 150 may be notified regarding the event. The tenant-specific situational analysis framework 150 then determines the appropriate policy to follow. This may involve determining a particular modality, such as SMS, email, page, etc. that will be used to notify a tenant-specific administrator.

As yet another example, the system management tool 102 may comprise a data migration manager implemented in a tiered storage environment of the cloud infrastructure 120. The data migration manager may be configured to control migration of data among tiers of the tiered storage environment based on the situation classification results provided by the classifier 106, possibly in combination with information relating to one or more searches previously performed in the tiered storage environment.

In an arrangement of this type, the situational classification could be monitoring a digital preservation system that includes a primary disk array backed by an archival object store. Ingested data is initially stored on the primary disk array along with metadata about what is getting preserved. Policies implemented in a policy engine of the data migration manager control migration of data between the fast disk array and the slower object store. Given a situational classification of this configuration, the data migration manager can combine the situation classification with hints emanating from recent metadata searches made by digital curators in order to more effectively move digital content between the primary disk array and the archival object store.

Thus, for instance, a digital curator may have been recently researching the Cuban Missile Crisis when the disk array capacity begins to fill up. This situation, and the meta-data search hints, can cause the policy engine to "stage-out" content that is unrelated to the Cuban Missile Crisis (e.g., content from the beginning of the Kennedy presidency) while prefetching images, videos and documents that were relevant to the crisis. Likewise, a situation in which the replication link of an object store is broken may cause the policy engine to enable disk array replication on incoming scanned content and then prevent the migration to the object store until the situation is fixed.

The techniques of the present invention may be implemented in numerous other types of system management tools, and in a wide variety of other processing applications.

As indicated previously, situation classification functionality such as that described in conjunction with the flow diagram of FIG. 5 and one or more of the other examples described herein can be implemented at least in part in the form of one or more software programs stored in memory and executed by a processor of a processing device such as a computer or server. A memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and information technology infrastructure arrangements. Numerous other alternative embodiments within the scope of the appended claims will be readily apparent to those skilled in the art.

What is claimed is:

1. A method comprising the steps of:
   receiving a result of a situation classification operation from a classifier; and
   automatically taking a management action in a system management tool for a managed system based at least in part on the result of the situation classification operation;
   wherein the system management tool has a first scope of vision of the system and the classifier has a second scope of vision of the system different than the first scope of vision, the first and second scopes of vision comprising respective abilities to measure metrics associated with or otherwise impacting operating conditions of the system;
   wherein the situation classification operation comprises monitoring operation of the system in a situational state space having dimensions that characterize one or more operating conditions of the system to identify a current state of the system in the situational state space;
   wherein at least one of the operating conditions of the system is within the second scope of vision and outside the first scope of vision; and
   wherein the steps are performed by at least one processing device comprising a processor coupled to a memory.

2. The method of claim 1 further comprising:
   performing the situation classification operation; and
   providing the result of the situation classification operation to the system management tool;
   wherein the result of the situation classification operation is provided to the system management tool via an application programming interface.

3. The method of claim 1 wherein the management action is taken in the system management tool based at least in part on the result of the situation classification operation and additional information available to the system management tool, said additional information comprising at least one of local information available internally to the system management tool and a combination of information obtained from a plurality of information sources external to the system management tool.

4. The method of claim 1 wherein the step of automatically taking a management action in the system management tool comprises setting at least one policy in the system management tool by selecting and deploying a particular one of a plurality of policy sets responsive to the result of the situation classification operation.

5. The method of claim 1 wherein the situation classification operation is performed at least one of periodically and responsive to occurrence of a designated event.

6. The method of claim 1 wherein the situation classification operation is performed in a situational analysis framework of a first processing device and the system management tool is implemented on a second processing device.

7. The method of claim 1 wherein the system management tool comprises at least one of a quality of service manager, a data migration manager, a resource manager, a load balancer, a workflow manager and an event handler.

8. The method of claim 7 wherein the system management tool comprises a quality of service manager implemented in a cloud service environment, the quality of service manager being configured to adjust virtual resource scheduling in the cloud service environment in order to meet one or more service level agreements, based on the result of the situation classification operation in combination with information characterizing individual tenants and their associated virtual resources.

9. The method of claim 8 wherein the information characterizing individual tenants and their associated virtual resources is processed by a mash-up application before being combined with the result of the situation classification operation.

10. The method of claim 8 wherein the management action taken by the system management tool comprises delivering the situation classification result to separate situational analysis frameworks associated with respective ones of a subset of the tenants as identified by the system management tool based on the result of the situation classification operation in combination with the information characterizing individual tenants and their associated virtual resources.

11. The method of claim 7 wherein the system management tool comprises a data migration manager implemented in a tiered storage environment, the data migration manager being configured to control migration of data among tiers of the tiered storage environment based on the result of the situation classification operation and information relating to one or more searches previously performed in the tiered storage environment.

12. The method of claim 1 wherein system management tool comprises a situational analysis framework configured to determine the management action based at least in part on the result of the situation classification operation.

13. A computer program product comprising a non-transitory processor-readable storage medium having encoded therein executable code of one or more software programs, wherein the one or more software programs when executed by the processor of the processing device implement the steps of:
   receiving a result of a situation classification operation from a classifier; and
   automatically taking a management action in a system management tool for a managed system based at least in part on the result of the situation classification operation;
   wherein the system management tool has a first scope of vision of the system and the classifier has a second scope of vision of the system different than the first scope of vision, the first and second scopes of vision comprising respective abilities to measure metrics associated with or otherwise impacting operating conditions of the system;
   wherein the situation classification operation comprises monitoring operation of the system in a situational state space having dimensions that characterize one or more operating conditions of the system to identify a current state of the system in the situational state space;
   wherein at least one of the operating conditions of the system is within the second scope of vision and outside the first scope of vision.

14. An apparatus comprising:
   a system management tool implemented on at least one processing device;
   wherein the system management tool is configured to receive a result of a situation classification operation from a classifier, and to automatically take a management action relating to a managed system based at least in part on the result of the situation classification operation;

wherein the system management tool has a first scope of vision of the system and the classifier has a second scope of vision of the system different than the first scope of vision, the first and second scopes of vision comprising respective abilities to measure metrics associated with or otherwise impacting operating conditions of the system;

wherein the situation classification operation comprises monitoring operation of the system in a situational state space having dimensions that characterize one or more operating conditions of the system to identify a current state of the system in the situational state space;

wherein at least one of the operating conditions of the system is within the second scope of vision and outside the first scope of vision.

15. The apparatus of claim 14 wherein the system management tool comprises at least one of a quality of service manager, a data migration manager, a resource manager, a load balancer, a workflow manager and an event handler.

16. The apparatus of claim 14 wherein the situation classification operation is performed in a situational analysis framework external to the system management tool.

17. The apparatus of claim 14 wherein the management action is taken in the system management tool based at least in part on the result of the situation classification operation and additional information available to the system management tool, said additional information comprising at least one of local information available internally to the system management tool and a combination of information obtained from a plurality of information sources external to the system management tool.

18. The apparatus of claim 14 wherein the system management tool is configured to select and deploy a particular one of a plurality of policy sets responsive to the result of the situation classification operation.

19. The apparatus of claim 14 wherein the management action relates to a controllable parameter of an information processing system comprising at least one of a cloud service environment and a tiered storage environment.

20. The method of claim 1, wherein the second scope of vision is broader than and fully encompasses the first scope of vision or partially overlaps with the first scope of vision.

* * * * *